June 10, 1924.  
E. V. LAWRENCE  
BRAKE  
Filed Aug. 8, 1918  
1,496,897  
2 Sheets-Sheet 2

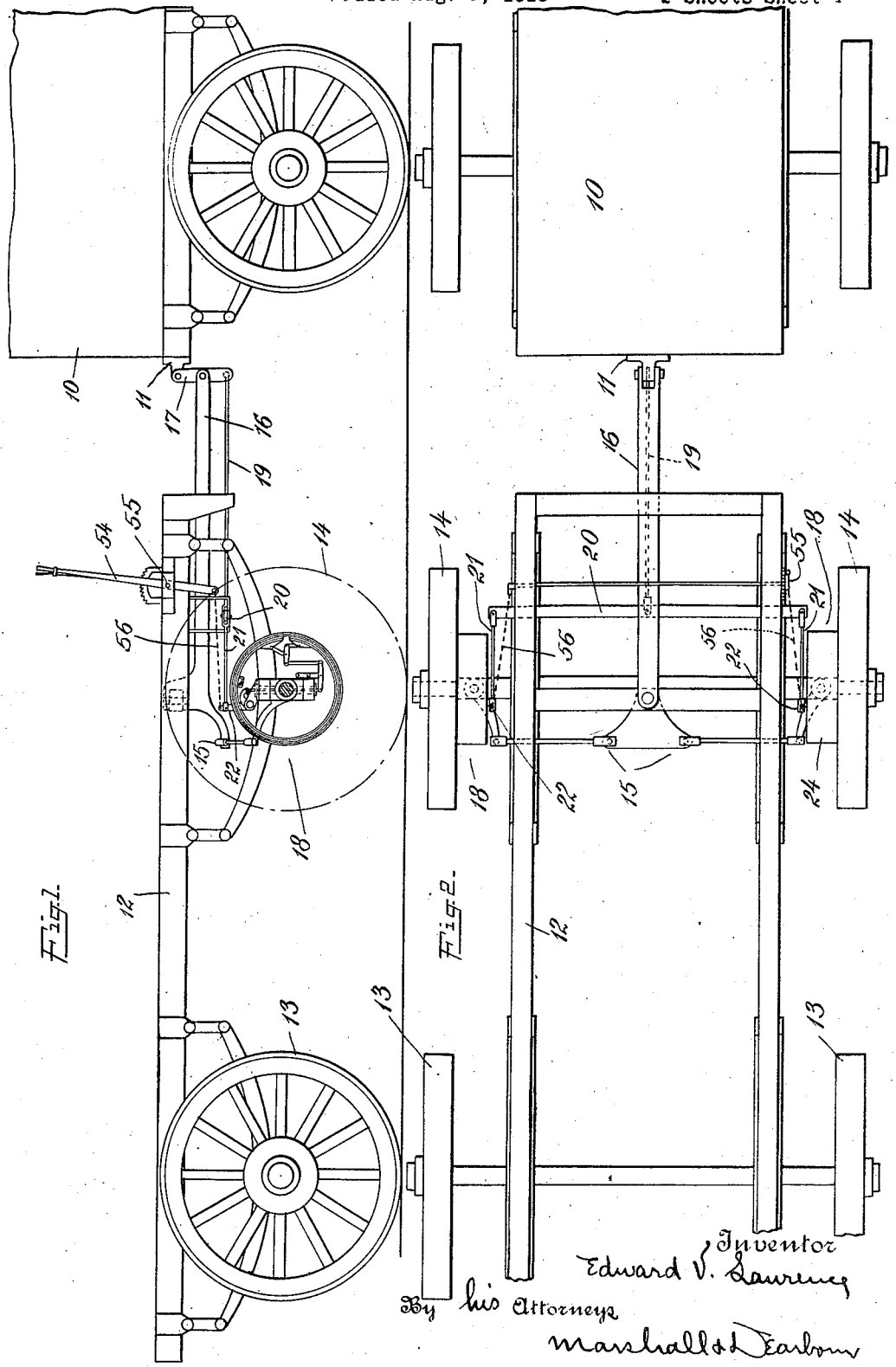

Inventor  
Edward V. Lawrence  
By his Attorneys  
Marshall & Darborn

Patented June 10, 1924.

1,496,897

UNITED STATES PATENT OFFICE.

EDWARD V. LAWRENCE, OF DUMONT, NEW JERSEY, ASSIGNOR TO E. V. LAWRENCE SAFETY BRAKE COMPANY, INC., OF NEW YORK, N. Y., A CORPORATION OF NEW YORK.

BRAKE.

Application filed August 3, 1918. Serial No. 248,369.

*To all whom it may concern:*

Be it known that I, EDWARD V. LAWRENCE, a citizen of the United States, and a resident of Dumont, county of Bergen, and State of New Jersey, have invented certain new and useful Improvements in Brakes, of which the following is a specification, reference being had to the accompanying drawings, forming a part thereof.

My invention relates to brakes and has special reference to those of the type shown and described in my Patent No. 1,271,916 granted July 9, 1916, in which the brake is automatically applied on a vehicle or vehicle section when the vehicle or section is moving in a forward direction and exerts a forward push upon the traction means, but is automatically released to permit the backing of the vehicle. In the case of a horse-drawn vehicle, the vehicle itself in going down hill or in coming to a stop, pushes against the horse and the automatic brake is set under these conditions and is released when the horse pulls forwardly. The brake acts similarly when the horse is replaced by a motor vehicle, the vehicle on which the automatic brake is located then being a trailer or semi-trailer. An automatic brake of this character as applied to a semi-trailer, or two-wheel trailer connected to the tractor by a 5th wheel connection, is shown and described in my Patent 1,370,131, granted March 1, 1921.

My present invention relates to improvements in the structures shown in the applications above mentioned and it has for one object to provide a simple and durable brake construction that shall be adapted to be applied to a steered wheel and which shall operate automatically irrespective of the angle to which the steered wheel may be turned.

Another object of my present invention is to provide an automatic brake of the character above indicated in which the brake actuating mechanism shall be largely disposed within the brake drum and closely associated with or attached to the axle so that it may be manufactured as a part of the axle.

A further object is to provide an internal brake that shall be adapted to operate automatically without interfering with the backing of the vehicle and that shall expand the brake ring or shoe in a particularly effective manner.

In order that my invention may be thoroughly understood, I will now proceed to describe the same in the following specification, and will then point out the novel features thereof in appended claims.

Referring to the drawings:

Figure 1 is an elevation showing the rear of a motor truck or tractor having a four-wheel trailer coupled thereto, the steered wheels of the latter being provided with automatic brakes arranged and constructed in accordance with my invention.

Figure 2 is a plan view of the construction shown in Figure 1, the body of the trailer being omitted in both figures to more clearly indicate the arrangement of the brake mechanism.

Figure 3:
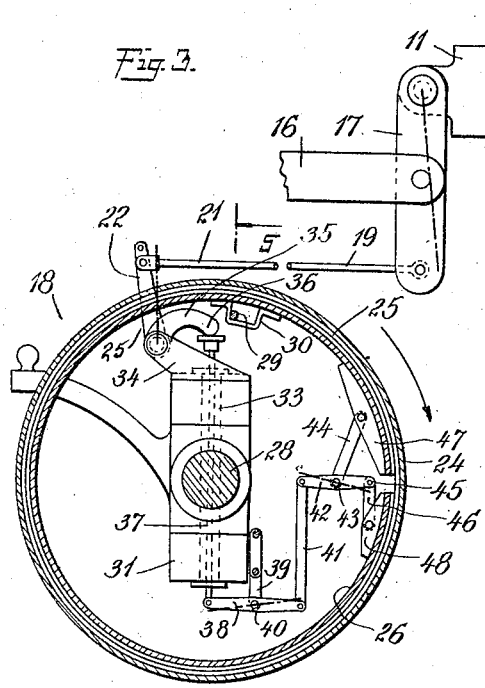
Figure 3 is a detail view of the brake mechanism shown in released position, corresponding to forward vehicle movement and drawn to a larger scale. The center lines of the actuating levers when the brake is automatically set by the forward pressure of the trailer on the tractor are indicated by broken lines.

In the drawings, 10 designates any suitable tractor such as a motor truck having a trail coupling projection 11. 12 designates the chassis of a trailer having rear wheels 13 and forward wheels 14 which are provided with steering knuckles and are adapted to be steered by any suitable mechanism 15 in response to the turning of the draw bar 16.

This draw bar instead of being coupled directly to the trail coupling projection 11 is connected thereto by a lever 17 which serves to actuate automatic brakes 18 with which the steered wheels 14 of the trailer are provided.

The lever 17 is pivoted at its upper end to the projection 11 and is pivotally connected at an intermediate point to the draw bar 16 as clearly shown in Figure 1. Its lower end is connected to a brake actuating rod 19 which extends backwardly substantially in parallelism with the draw bar 16 and is connected to the middle point of an evener or equalizing bar 20. This bar is connected near its ends by links 21 to arms 22 of brake actuating bell crank levers 23.

Figure 4:
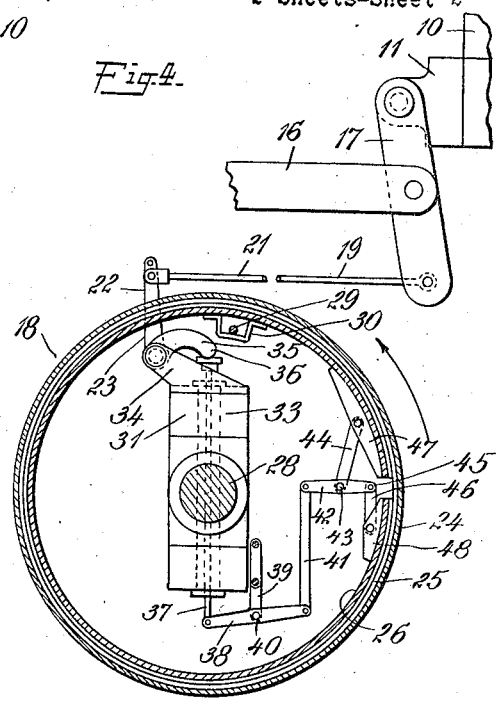
Figure 4 is a view corresponding to Figure 3 but showing the parts in the positions assumed when the vehicle is backing, with the brake mechanism released due to the backward rotation of the trailer wheels.
Figure 5:
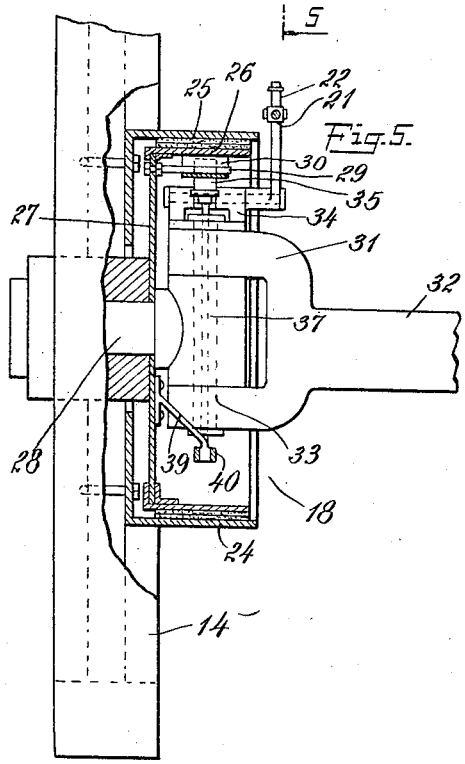
Figure 5 is a sectional elevation of the brake mechanism taken on the line 5—5 of Figure 3.

A brake drum 24 is secured to each of the wheels 14 and has an internal substantially cylindrical brake surface 25. The brakes 18 for the two wheels are alike and it will only be necessary to describe one, special reference being had to Figures 3, 4 and 5, for this purpose. The brake here shown comprises an expandible ring or shoe 26 which is disposed within the cylindrical brake drum 24. The brake actuating mechanism is mounted on a disc or plate 27 which is affixed to a stub axle 28 of the vehicle. It is therefore held against rotation but turns with the wheel about the axis of the steering knuckle as the trailer is steered. The plate or disc 27 has a pin 29 which extends into a strap or bracket 30 on the shoe 26 and is adapted to prevent the rotation of the shoe with the wheel and the drum which is secured to the wheel. However, this arrangement permits a predetermined amount of lost motion for the purpose of automatically releasing the brake when the trailer is being backed by the tractor as hereinafter explained.

The stub axle is pivotally mounted in the forked end 31 of the axle 32 in the usual manner a hollow knuckle pin 33 extending through the joint. A supporting bracket 34 is attached to the upper arm of the fork 31 and forms a pivot for the bell crank lever 23 which actuates the brake. This bell crank lever, in addition to the arm 22, has a curved arm 35 which is provided with a ball or cam extremity 36 which extends into the axis of the stub axle pivot, the arrangement of parts being such that when the stub axle and wheel turn, the brake turns with them but the bell crank lever which actuates the brake remains in a relatively fixed position, the connection being established between the actuating mechanism which is directly connected to the shoe 26 and the bell crank lever by a pin or rod 37 which extends through the hollow knuckle pin 33 and is enlarged at the top to cooperate with the ball or cam extremity 36 of the curved arm 35. The pin is connected at its lower end to a lever 38 which is pivotally suspended at an intermediate point 40 by a link 39 and is connected at its opposite end by a link 41 to a lever 42. This lever is pivotally connected at 43 to a brake actuating link 44 and is pivoted at 45 to a brake actuating link 46. The link 44 is connected at its opposite end to an abutment 47 at one end of the brake shoe 26 and one end of the link 46 is connected to an abutment 48 at the opposite end of the brake shoe.

Before describing the modified structure of Figure 6, the operation of the brake will be discussed. If it is assumed that the tractor 10 is drawing the trailer the draw bar 16 is in tension and is pulling backwardly on the lever 17. Thus, the brake actuating rod 19 is released and the arrangement of parts is as shown in full lines in Figure 3. The brake shoe is preferably formed very slightly smaller than the brake drum with which it cooperates so that when released as in Figure 3, there is no material braking action.

If the tractor is brought to a stop by applying its own brakes (which are not shown) or otherwise, or if the vehicle goes over a hummock or into a depression there will obviously be a tendency for the trailer to push against the tractor and as soon as any pushing force is exerted with the brake arrangement of my invention, the draw bar 16 will swing the lever 17 forwardly into the dotted line position of Figure 3 with the result that the brakes will be set by a forward pull on the bar 19 and the rods 21. The pull is divided with substantial equality between the rods 21 by the evener 20 and the pull is transmitted to the bell crank levers 23 which, when actuated, push downwardly on the pins or rods 37. This movement is transmitted through the lever 38 and the link 41, to the lever 42. This lever when moved to the dotted line position of Figure 3 pushes upwardly on the link 44 and downwardly on the link 46, thus expanding the brake shoe and setting the brake. The force with which the brake is set depends on the force of the push exerted by the trailer and consequently the braking action is automatically varied in accordance with the prevailing conditions. For example, if the trailer is heavily loaded the brake will be much more strongly applied, than when the trailer is empty and when the vehicle is going down a steep grade the brake will be more strongly applied than when the grade is low. It is evident that the tendency of the brake is to smooth out the operation of the trailer and prevent it from continually hammering the tractor. Furthermore, the instant the tractor begins to pull forward on the trailer the action of the levers is reversed and the brakes released. This is of great importance as it is a well known fact that when trailer brakes are applied by hand they often do more harm than good because they are not released at the proper time in starting the load.

The action of the trailer relative to the tractor is the same when the tractor is backing the trailer as when the trailer is pushing against the tractor except as to the direction of wheel rotation and the above described brake operation depends on the vehicle wheel rotation, the bracket 30 occupying the relation to the stop pin 29 as shown in Figure 3. When the tractor starts back and the trailer wheel begins to turn in a backward direction, even through a slight angle, the brake band or shoe is moved through a small arc to take up the lost motion in the bracket 30. This carries the fulcrum of the lever 42 to such position that the actuating movement of the bell crank lever 23 merely moves the parts to their initial released position instead of setting the brake. It is thus apparent that this brake operates on the same broad principle of the movable fulcrum release for backing as the brakes shown and described in my Patent No. 1,271,916 to which reference has already been made.

Figure 6:
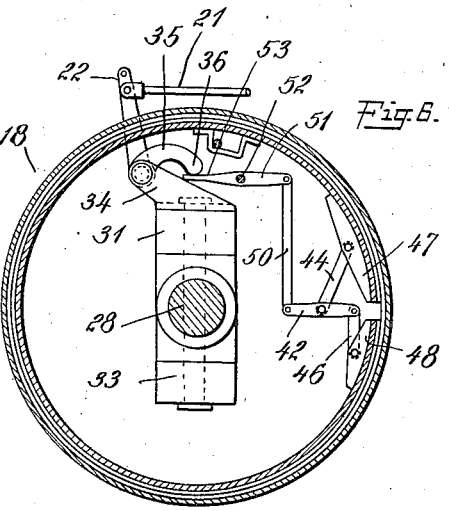
Figure 6 is a view corresponding to Figure 3 showing a slightly modified brake actuating mechanism which also embodies my invention.

The brake mechanism is somewhat simplified in the modification of Figure 6, by the omission of the pin or rod 37 which extends through the knuckle pin 33. In this figure the brake shoe abutments 47 and 48 are connected to the lever 42 by links 44 and 46 as in the previous arrangement. The lever 42 is connected at its inner end by a link 50 to one end of a lever 51. This lever is pivoted at 52 on the disc 27 and has an enlarged or flattened end 53 which extends into the axis of the knuckle joint and is engaged by the ball extremity 36 of the bell crank arm 35. The operation of this arrangement is the same as that already described.

I have shown a hand lever 54 pivotally mounted at 55 on the trailer frame for actuating the bell crank lever 23 to which it is connected by a chain 56. The lever 54 when released obviously does not interfere in any way with the automatic operation of the brake and it may be omitted. In case however it is desired to set the brake by hand as for example when the trailer is detached from the tractor or when the trailer is loaded and standing on an up-grade, this result can readily be accomplished by setting the hand lever. The action of the hand lever can be carried through to such an extent that the brake will be set even after the lost motion between the pin 29 and bracket 30 has been taken up.

Structures of preferred form and construction have been illustrated and described for the purpose of showing ways in which this invention may be used, but the inventive thought upon which this application is based, is broader than these illustrative embodiments thereof, and I therefore intend no limitations other than those imposed by the appended claims.

What I claim is:

1. A trailer having a draw bar, brakes for the trailer arranged to be automatically released by a backward turning movement of the trailer wheels, actuating means for the trailer brakes, and a lever pivotally mounted on the draw bar and connected to the brake actuating means and adapted to be connected to the coupling member of a tractor, whereby forward and back movements of the trailer relative to the tractor actuate the brakes.

2. A trailer having a draw bar, brakes for the trailer, an actuating rod for the trailer brakes, and a lever pivotally mounted on the draw bar and connected to the brake actuating rod and adapted to be connected to the coupling member of a tractor, whereby forward and back movements of the trailer relative to the tractor actuate the brakes, and means independent of the brake rod for releasing the brakes in response to backward turning of the trailer wheels.

3. A trailer having a draw bar, brakes for the trailer arranged to be automatically released by a backward turning movement of the trailer wheels, an actuating rod for the trailer brakes, and a lever pivotally mounted on the draw bar and connected to the brake actuating rod and adapted to be connected to the coupling member of a tractor, whereby forward and back movements of the trailer relative to the tractor actuate the brakes, and manually operative means for setting the brake independently of the brake rod.

4. A trailer having a draw bar, brakes for the trailer, an actuating rod for the trailer brakes, and a lever pivotally mounted on the draw bar and connected to the brake actuating rod and adapted to be connected to the coupling member of a tractor, whereby forward and back movements of the trailer relative to the tractor actuate the brake rod, means independent of the brake rod for releasing the brake in response to backward turning of the trailer wheels, and manually operative means for setting the brake independently of the brake rod.

5. A trailer comprising stub axles and steered wheels mounted thereon, brakes for the wheels, brake actuating means secured to the stub axles, and means for coupling the trailer to a tractor and dependent upon a forward and back movement of the trailer relative to the tractor for actuating the brakes independently of the steering position to which the wheels are turned.

6. A trailer comprising stub axles and steered wheels mounted thereon, brakes for the wheels, brake actuating means secured to the stub axles, and means for coupling to a tractor and dependent upon a forward and back movement of the trailer relative to the tractor for actuating the brakes independently of the steering position to which the wheels are turned, the brake actuating means being adapted to be automatically released dependent on the backward turning of the trailer wheels, independently of the forward and back movement between the trailer and the tractor.

7. An automatic brake for trailers having steered wheels, comprising a supporting means affixed to the wheel axle close to the wheels and adapted to turn therewith, brake actuating gearing mounted on the supporting means, and means mounted on a relatively fixed part of the trailer, for coupling to a tractor and actuated by a forward and back movement of the trailer, arranged to cooperate with the actuating gearing in any position of the steered wheels.

8. A trailer having a steered wheel axle, a support secured thereto, a brake for the steered wheel, brake actuating means comprising a lever extending at one end into the line of the steering axis, means for coupling to a tractor, and means cooperating with the lever mounted on a relatively fixed part of the trailer and responsive to the coupling means and to the forward and back movement of the trailer relative to the tractor for controlling the brakes.

9. A trailer having an axle with a fixed intermediate member, stub axle members pivoted thereto for steering and wheels thereon, a brake support secured to each stub axle adjacent to the wheel, a brake drum secured to the wheel, a brake member cooperating with the drum, actuating means therefor including mechanism within the drum comprising a lever having one end extending into the line of the stub axle pivot, and a cooperating lever having a pivot on the fixed member of the axle.

10. A trailer having a fixed axle member and stub axles pivoted thereto, steered wheels on the stub axles, brake drums secured to the wheels, expandible shoes within the brake drums, a support affixed to each stub axle, a lug on each support arranged to prevent rotative movement of the expandible shoe in a forward direction, brake actuating levers on the supports, cooperating levers on the fixed axle member, means for coupling to a tractor, and means dependent upon a forward and back movement of the trailer relative to the tractor for actuating the cooperating levers, the said actuating levers on the support being inoperative when the expandible brake shoe is adjusted by a backward turning movement of the wheels.

In witness whereof, I have hereunto set my hand this 27 day of June, 1918.

EDWARD V. LAWRENCE.